Aug. 27, 1968  R. V. MATHERS  3,398,946
CONTOURED BRACKET POSITIONED BETWEEN A SPRING AND AXLE
Filed Oct. 24, 1966
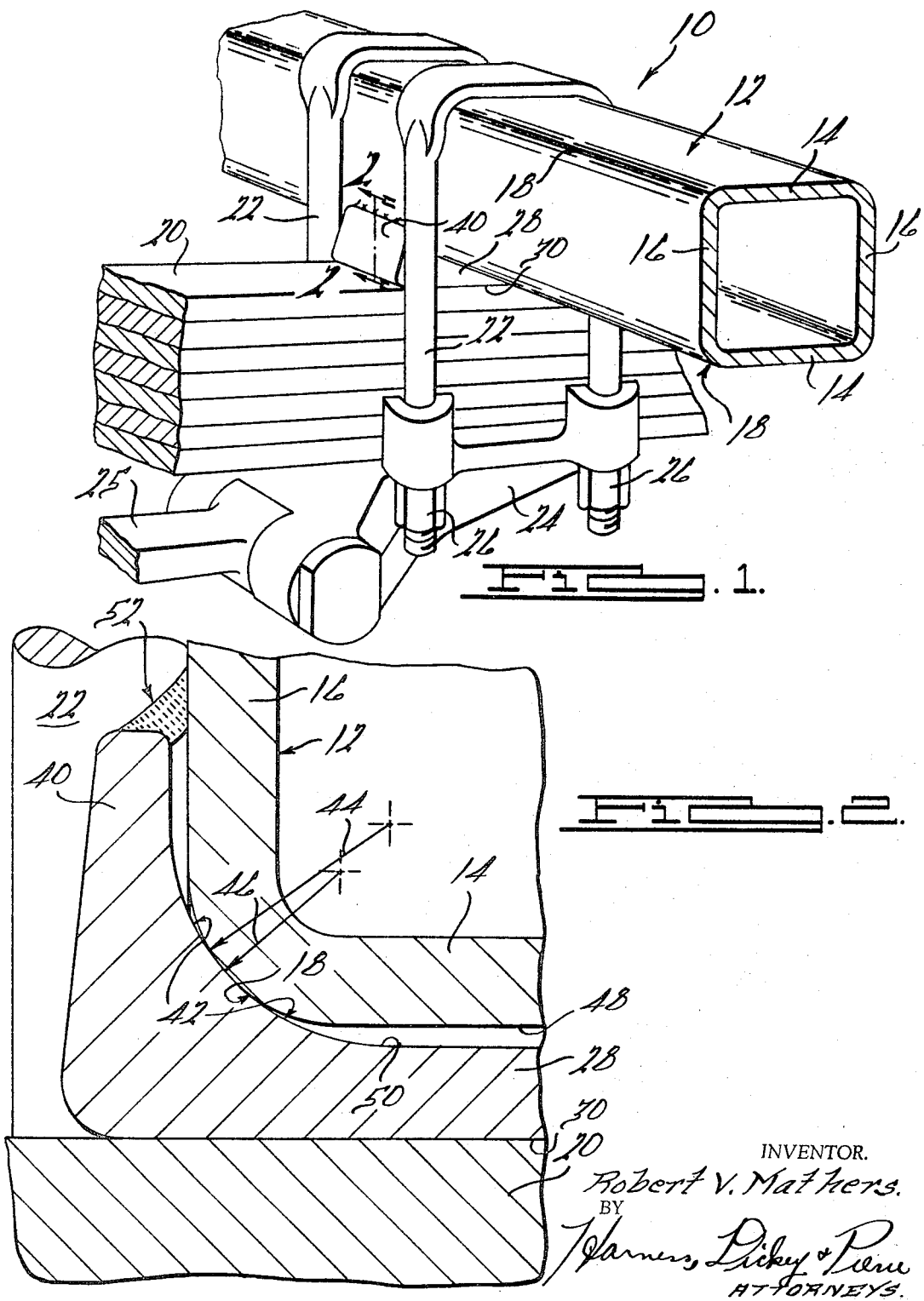
INVENTOR.
Robert V. Mathers
BY
Harness, Dickey & Pierce
ATTORNEYS.

United States Patent Office 3,398,946
Patented Aug. 27, 1968

3,398,946
CONTOURED BRACKET POSITIONED BETWEEN A SPRING AND AXLE
Robert V. Mathers, Grosse Pointe Farms, Mich., assignor to Fruehauf Corp.
Filed Oct. 24, 1966, Ser. No. 594,345
5 Claims. (Cl. 267—52)

ABSTRACT OF THE DISCLOSURE

A spring and axle mounting assembly comprised of a specially contoured seating bracket which is positioned between the spring and the axle to allow the axle to be secured to the leaf spring in a manner which acts to prevent and minimize stresses in the mounted axle while at the same time prolonging the life of the axle in actual usage.

---

This invention generally relates to an improved spring and axle mounting assembly, and more particularly the invention relates to a spring and axle mounting assembly wherein a rectangular axle with curved corners is mounted to a leaf type suspension spring.

One object of this invention is to provide an improved spring and axle mounting assembly.

Another object of the present invention is to provide an improved spring and axle mounting assembly which utilizes a bracket having a contoured seating surface for contact with the axle thereby enabling easy positioning of the axle in the mounting assembly and also providing the axle with an increased resistance to crushing when clamping the spring to the axle.

Another object of the present invention is to provide an improved spring and axle mounting assembly wherein vertical forces of clamping are transferred directly to the axle side walls and not to a horizontal wall of the axle which has a tendency to crush, said vertical forces being directed into the axle side walls through the use of a bracket having a contoured surface contacting the axle.

Another object of the present invention is to provide an improved spring and axle mounting assembly which is practical and economical to produce.

Still another object of the present invention is to provide a spring and axle mounting assembly of an improved design which simplifies and makes more economical the welding process used in constructing the finished assembly.

Other objects, features and advantages of the present invention will become apparent from the subsequent description and the appended claims taken in conjunction with the accompanying drawings, in which:

FIGURE 1 illustrates a spring and axle mounting assembly in accordance with the invention; and FIGURE 2 shows a cross sectional view along the line 2—2 of FIG. 1 and illustrates that the bracket disposed between the axle and the spring has a contoured seating means thereon which provides a unique seating contact with the axle positioned within the bracket.

Broadly stated, the present invention is a spring and axle mounting assembly comprised of a generally rectangular cross sectioned axle with curved exterior corners, a leaf-type suspension spring, and a bracket disposed between the spring and the axle for positioning the spring relative to the axle. The bracket includes a pair of flange members which generally overlie the side walls of the axle and the flange members are fixed to the side walls of the axle, such as by welding or the like; and the bracket also includes a contoured seating means which provides seating contact with the axle only at the exterior corners.

The axle is held clamped to the leaf spring with the bracket disposed therebetween through the use of bolt means, such as U-bolts or the like. The leaf spring can be disposed above the axle, or below the axle in underslung fashion; however, in either disposition a contoured seating bracket is used to separate the axle from the spring and to provide a contoured seating surface for cradling the axle. When the axle is disposed below the leaf spring the opposite nonwelded bracket should have the same type contour. The leaf spring may have one or several leaves.

FIGURE 1, in accordance with the invention, shows a spring and axle mounting assembly generally designated 10 and the assembly includes a generally rectangular cross sectional axle 12 having a pair of horizontal walls 14 and a pair of side walls 16. The walls are connected to form curved exterior corners 18. The axle 12 is mounted in conjunction with a leaf type suspension spring 20 through the use of U-bolts 22 connected to plate means 24 with nuts 26. The axle 12 is separated from the spring 20 by a bracket 28 which has one surface 30 in flat engagement with the spring 20. Plate 24 may also suitably include a radius rod 25 mounted in pivotal relationship therewith, however, the radius rod is not essential to utilization of the present invention.

FIGURE 2 more clearly illustrates the unique features of the mounting assembly of FIG. 1, showing that the axle 12 is seated within the bracket 28 and separated by the bracket from the leaf spring 20. The bracket 28 has an upwardly extending flange member 40 on each side thereof which overlies the side wall 16 of the axle. A contoured seating means or surface is formed within the bracket 28 by curved portions 42 on either side of the bracket 28, which curved portions 42 provide seating contact with the curved exterior corners 18 on the axle 12. The curved portions 42 have a radius designated 44 which is greater than the radius designated 46 of the exterior corners 18 on the axle 12. Since the radius 44 is greater than the radius 46 the axle contacts the contoured seating means formed within the bracket 28 only at the curved portions 42 on either side of the bracket; and the flat surface 48 of the axle 12 as shown in FIG. 2 does not contact the flat surface 50 which runs across the bracket 28 between the flange members 40.

The flange members 40 are secured to the side walls 16 of the axle by any suitable means; however it is preferred that the securement of the bracket 28 to the side wall 16 be made by the use of welding, and in FIG. 2 the weld 52 is shown fixedly securing the flange 40 to side wall 16.

The features of the invention should be apparent from the above detailed description. In this respect the bracket 28 contacts the axle corner 18 and the corner radius 46 in such a manner as to allow angular rotation between the axle 12 and the contoured seating means formed by the curved portions 42. The rotation is limited by the protruding ends or flanges 40 which contact the sides 16 of the axle. By allowing this angular movement of the axle 12 when mounting the axle to a pair of leaf springs generally at each end thereof using two brackets 28, both said brackets may be aligned with each other and this has not been possible heretofore when spring chairs or brackets were set flat in contact with the axle.

Fatigue tests on an axle with brackets setting flat thereon have conclusively shown that a shorter life is obtained with that type assembly than with an axle ultizing the mounting assembly in accordance with this invention. This is due apparently to the fact that the failure occurs generally on the tension side at the extreme fibre from the neutral axis of the beam, and by avoiding contact between axle and chair or contoured bracket at this point the life is extended.

It should also be apparent that since the brackets 28 containing the contoured seating means are made such that they include a larger inside radius 44 than the corner radius 46 of the axle 12 with which contact is made, that this allows angular alignment of the brackets and assures that the contact point will not be on the flat surface, such as surface 48, of the axle. The difference in magnitude between radius 44 and radius 46 is relatively small so that with some pressure being applied upon clamping of the mounting assembly at time of installation, the contact zone between the corner 18 and the curved portion 42 is increased to more than just a point contact. By contacting on the corner 18 of the axle 12, the vertical forces of clamping are transferred directly into the axle side walls 16 and not into the flat surface 48 of the axle; and this acts to prevent crushing of the axle during the clamping. In addition the structure of flange members 40 allows for the flange to be welded to the side wall 16 along a horizontal direction and the area in which the welding operation is to be carried out is easily accessible; and still further, the amount of weld required is relatively low. The bracket 28 which contains the contoured seating surface or means also provides for the seating or engagement of the leaf-type spring 20 against the flat seating surface 30 of the bracket as shown in FIG. 2, moreover, the bracket retains the spring 20 from lateral movement by locating between the U-bolts 22. The bracket 28 is economical and practical to manufacture and yet requires a relatively small amount of metal per piece.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:
1. A spring and axle mounting assembly comprising: a generally rectangular cross sectional axle having a pair of generally horizontal walls in connection with a pair of said side walls to form curved exterior corners on the axle, a leaf-type suspension spring, and disposed between said spring and said axle, a bracket for positioning said spring relative to said axle, said bracket including a pair of flange members which generally overlie the side walls of said axle, said flange members being fixedly secured to said side walls, and said bracket also including a contoured seating means for providing seating contact with the axle only at said exterior corners, and bolt means removably securing said axle to said spring and holding said bracket therebetween, said contoured seating means being formed by curved portions on said bracket, which curved portions provide seating contact between said bracket and said axle normally only at said curved exterior corners on the axle, each of said curved portions having a radius greater than the radius of said exterior corners, said contoured seating means being operable to allow angular rotation between the axle and the bracket.
2. The assembly of claim 1 wherein:
said flange members are secured to said side walls by welding.
3. The assembly of claim 1 wherein:
said bolt means is comprised of U-bolts and said bracket is disposed between the U-bolts in order to prevent lateral movement of the spring relative to the axle.
4. The assembly of claim 3 wherein:
said flange members are secured to said side walls by welding.
5. A mounting assembly for use with spring and axle arrangements and the like comprising:
a generally rectangular cross sectional first member having a pair of generally horizontal walls in connection with a pair of side walls to form curved exterior corners on the member,
a leaf-type spring, and disposed on said spring and integral therewith,
a bracket member for positioning said spring relative to said first member said bracket members generally including:
a pair of flange members which generally overlie the side walls of said first member, said flange members being fixedly secured to said side walls, and said bracket member also including:
a contoured seating means providing seating contact with the first member only at said curved exterior corners, said contoured seating means being formed by curved portions on said bracket, which curved portions come into seating contact with the curved exterior corners on the axle, each of said curved portions having a radius greater than the radius of said exterior corners, and
means for removably securing said first member to said spring and holding said bracket member therebetween.

References Cited

UNITED STATES PATENTS

| | | | |
|---|---|---|---|
| 1,314,817 | 9/1919 | Laycock | 267—52 |
| 1,955,824 | 4/1934 | Mogford | 301—124 |
| 2,007,793 | 7/1935 | Crawford | 301—124 |

RICHARD J. JOHNSON, *Primary Examiner.*

UNITED STATES PATENT OFFICE
CERTIFICATE OF CORRECTION

Patent No. 3,398,946              August 27, 1968

Robert V. Mathers

It is certified that error appears in the above identified patent and that said Letters Patent are hereby corrected as shown below:

Column 3, line 40, cancel "said".

Signed and sealed this 10th day of February 1970.

(SEAL)
Attest:

Edward M. Fletcher, Jr.
Attesting Officer

WILLIAM E. SCHUYLER, JR.
Commissioner of Patents